July 22, 1952
L. W. EAMES
2,604,377
DISINFECTANT MAT
Filed Sept. 7, 1948
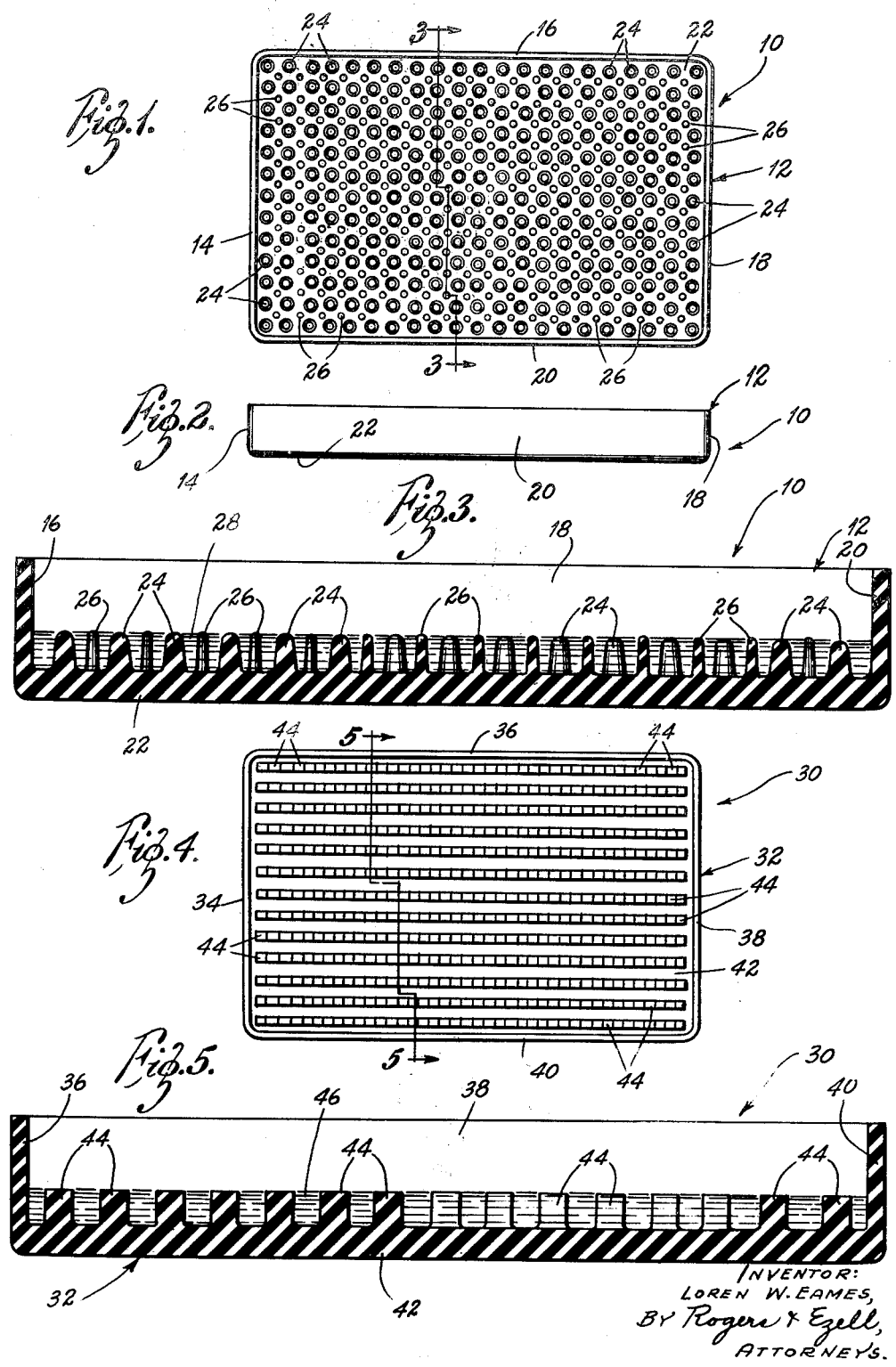
INVENTOR:
LOREN W. EAMES,
BY Rogers & Ezell,
ATTORNEYS.

Patented July 22, 1952

2,604,377

UNITED STATES PATENT OFFICE 2,604,377

DISINFECTANT MAT

Loren W. Eames, Caseyville, Ill.

Application September 7, 1948, Serial No. 48,089

3 Claims. (Cl. 21—61)

The present invention relates to a disinfectant mat for use on poultry farms and the like where it is objectionable to have germs carried on the soles of a person's shoes.

On poultry farms it is highly desirable to have some means for disinfecting the soles of a person's shoes when he travels from one poultry house to another, especially when entering the brooder house after having been in the runs or houses containing the grown poultry. One of the devices in use at the present time is a shallow metal pan which has a small amount of liquid disinfectant in the bottom into which the person steps, thereby wetting his shoes. This has numerous disadvantages, one of which is that the poultry may drink the disinfectant and become sick. Also, with this type of device, the disinfectant is very often splashed on the shoe uppers, thereby causing them to deteriorate. In addition, a liquid bath of this type often does not remove foreign matter from the shoe soles, with the result that the matter frequently drops off within the poultry house, thereby exposing a portion of the shoe sole which has not been disinfected.

It is an object of the present invention, therefore, to provide a disinfectant mat for wetting the soles of a user's shoes, and especially one that can be molded or otherwise formed as a single, unitary device.

Another object is to provide a disinfectant mat which immerses only the soles of the user's shoes regardless of his weight.

Another object is to provide a disinfectant mat which will aid in the removal of foreign matter from the soles of the user's shoes.

Another object is to provide a disinfectant mat which resists the corroding action of a liquid disinfectant.

Another object is to provide a disinfectant mat which is easily cleaned.

Other objects are to provide a disinfectant mat which is simple in construction, rugged, and which is relatively inexpensive to manufacture.

Further objects and advantages of the present invention will be apparent from the following description, reference being had to the accompanying drawing wherein preferred embodiments of the present invention are shown, in which:

Fig. 1 is a top plan view of one form of a mat made in accordance with the teachings of the present invention;

Fig. 2 is a front elevational view of the mat shown in Fig. 1;

Fig. 3 is an enlarged vertical sectional view taken on the line 3—3 in Fig. 1;

Fig. 4 is a top plan view of another form of mat made in accordance with the teachings of the present invention; and Fig. 5 is an enlarged vertical sectional view taken on the line 5—5 in Fig. 4.

Referring to the drawing more particularly by reference numerals, specifically Figs. 1-3, 10 indicates generally one form of a mat made in accordance with the teachings of the present invention. The mat is made of moldable material, and includes a shallow container 12 which has vertical side walls 14, 16, 18 and 20 and a bottom wall 22. A plurality of relatively thick, nipple-like projections 24 are formed integral with the bottom wall 22 and extend vertically upward therefrom. Interposed between the projections 24 are relatively thin, nipple-like projections 26 which also extend upwardly.

The device, including the tray with its bottom and side walls, and the projections, is made of a plastic material, preferably rubber because of its flexibility and elasticity. Both sets of projections are of approximately the same height and are made of a flexibile material such as rubber so that they will bend or buckle when a force is exerted against the tops thereof. In the preferred construction, the maximum distance between projections is approximately ¼", for a purpose to appear.

A liquid disinfectant 28 is disposed in the bottom of the shallow container 12 so that the upper surface thereof approximately coincides with the tops of the projections 24 and 26.

In Figs. 4 and 5, 30 indicates generally another form of mat made in accordance with the teachings of the present invention, which includes a shallow container 32 made of rubber or like material which has vertical side walls 34, 36, 38 and 40 and a bottom wall 42.

A plurality of upwardly extending projections 44 are formed integral with the bottom wall 42 and are grouped together so as to extend across the container 32 in the form of spaced ridges. The upper ends of the projections 44 are flat and substantially square-shaped, and the individual projections in each ridge are contiguous with the projections extending longitudinally on either side of them. The projections 44 are made of rubber or other flexible material so that they will bend or buckle when a force is exerted against the tops thereof.

A quantity of liquid disinfectant 46 is disposed in the bottom of the container 32 so that the upper surface thereof approximately coincides with the top of the projections 44.

It is to be understood that the projections in the two forms of mats herein illustrated could also be formed on a flat plate and the plate disposed in the bottom of a shallow container. The unitary construction is the preferred form, however, because of the manifest advantages, and the design is such that the entire device, in either modification, may be integrally molded.

In use, the disinfectant mat is placed outside of the room or building which one is interested in keeping free from germs, so that anyone entering the enclosure can step onto it in order to cleanse and disinfect the soles of his shoes.

After the user steps on the mat, he shuffles his feet back and forth, thereby causing the tops of the projections 24 and 26, or 44, to bend away from their vertical positions, thereby permitting the soles of the user's shoes to become immersed in the liquid bath within the tray. The yieldability of the projections is such that only the soles of the shoes are wet.

As the user's shoes are shuffled back and forth over the tops of the projections, the latter scrape off foreign matter adhering to the bottoms of the soles much in the same manner as a scrub brush or foot scraper, thereby permitting the entire sole to be subjected to the disinfectant.

In the form of mat illustrated in Figs. 1 to 3, the direction of foot movement is immaterial, but in the other form the best results are obtained when the user's shoes are moved perpendicularly to the ridges.

The container 12 or 32, made of rubber or like material, resists the corrosive action of the liquid disinfectant and facilitates cleaning of the mat. It is manifest that the mat can be easily and quickly cleaned by immersing it in a cleaning solution or by merely dumping out the disinfectant and spraying it with water from an ordinary garden hose.

By the present arrangement, the liquid remains normally below the level of the tops of the projections, and is less likely to be spilled out of the tray. The distance between adjacent projections, and to the side walls, is desirably in the order of ¼" maximum, as this limits the space so that fowls cannot get their bills between the projections so as to drink the disinfectant.

An integrally molded mat of this kind is easy to handle. It can be bent for cleaning. It is relatively cheap, and by suitable arrangement, such as by design of the projections, can be employed as an advertising medium.

What is claimed is:

1. A disinfectant device for use in disinfecting soles of shoes of a person who applies his weight onto the device comprising a shallow container having side walls, a plurality of individual, nipple-like projections projecting upwardly from the bottom of the container a distance at least equal to the thickness of a shoe sole, but terminating below the side walls, whereby liquid may be disposed in the container to approximately the level of the tops of the projections, the projections being of yieldable resilient material, being spaced apart over the bottom of the container, having the height aforesaid, and being depressible toward the bottom of the container a distance at least substantially equal to the thickness of a shoe sole, when the weight of a person is applied thereto, so that when a person stands upon them, they will become depressed toward the bottom and cause the shoe sole of the person to be immersed in the liquid, and the projections further having substantially vertical side walls so that they may scrape foreign matter from the soles of the shoes.

2. The device of claim 1, wherein there are a set of relatively yieldable projections over the bottom area, and a set of relatively resistant projections over the bottom area interpolated between the high projections.

3. The device of claim 1, wherein the projections are formed in a plurality of upstanding linear ridges, the ridges being separated by linear spaces, and each upstanding ridge being divided into a plurality of upstanding tooth-like projections successively contiguous to each other.

LOREN W. EAMES.

REFERENCES CITED

The following references are of record in the file of this patent:

UNITED STATES PATENTS

| Number | Name | Date |
|---|---|---|
| 1,425,830 | Bell | Aug. 15, 1922 |
| 1,931,146 | Hampel | Oct. 17, 1933 |
| 1,965,558 | Weirich | July 3, 1934 |
| 1,992,648 | Browne | Feb. 26, 1935 |
| 2,071,762 | Nickle | Feb. 23, 1937 |